US012728686B2

(12) United States Patent
Lee

(10) Patent No.: US 12,728,686 B2
(45) Date of Patent: Sep. 8, 2026

(54) SUSPENSION CONTROL DEVICE AND CONTROL METHOD THEREFOR, AND VEHICLE INCLUDING THE SAME

(71) Applicant: HL MANDO CORPORATION, Pyeongtaek-si (KR)

(72) Inventor: Kyungtack Lee, Pyeongtaek-si (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 36 days.

(21) Appl. No.: 18/917,046

(22) Filed: Oct. 16, 2024

(65) Prior Publication Data

US 2025/0313053 A1 Oct. 9, 2025

(30) Foreign Application Priority Data

Apr. 8, 2024 (KR) ........................ 10-2024-0047262

(51) Int. Cl.
*B60G 17/018* (2006.01)
*B60G 17/08* (2006.01)

(52) U.S. Cl.
CPC ........ *B60G 17/018* (2013.01); *B60G 2400/20* (2013.01); *B60G 2500/10* (2013.01); *B60G 2800/012* (2013.01)

(58) Field of Classification Search
CPC .............. B60G 17/018; B60G 2400/20; B60G 2500/10; B60G 2800/012; B60G 2200/10; B60G 17/08; B60G 2204/40; B60G 2204/62
See application file for complete search history.

(56) References Cited

U.S. PATENT DOCUMENTS

2019/0047347 A1* 2/2019 Yamamoto ............. B60G 17/06
2022/0388485 A1* 12/2022 Hirao ..................... B60G 17/08

* cited by examiner

*Primary Examiner* — Jacob M Amick
(74) *Attorney, Agent, or Firm* — Studebaker Brackett PLLC

(57) ABSTRACT

The present disclosure relates to a suspension control device, a control method therefor, and a vehicle including the same. The control device for controlling each suspension in a vehicle according to some embodiments includes at least: a memory and a processor that controls a damping force provided through each suspension in the vehicle using information stored in the memory. The processor identifies a current state of the vehicle using sensor data of a sensor unit of the vehicle, performs a first process of obtaining a currently damping force for a damper of each suspension according to the identified current state, identifies an output range for an output of an actuator of each damper, which changes according to a damper speed, and performs a second process of determining a target damping force for each damper in consideration of the identified output range.

18 Claims, 8 Drawing Sheets

SUSPENSION CONTROL DEVICE AND CONTROL METHOD THEREFOR, AND VEHICLE INCLUDING THE SAME

CROSS-REFERENCE TO RELATED APPLICATION

This application claims priority to and the benefit of Korean Patent Application No. 10-2024-0047262 filed on Apr. 8, 2024, the disclosure of which is incorporated herein by reference in its entirety.

BACKGROUND

1. Technical Field

The present disclosure relates to a vehicle suspension control technology, and more particularly, to a suspension technology that distributes a damping force in consideration of a physical operation limit of a suspension.

2. Discussion of Related Art

A suspension is a device that connects a vehicle body and wheels of a vehicle and is a device required to absorb a road impact, and at the same time, secures a tire contact force. That is, the suspension absorbs an impact generated while the vehicle travels on a road surface before the impact is transmitted to the vehicle body or occupants, thereby serving to decrease fatigue, increase durability, and make the occupants comfort.

In recent years, attempts have been made to integrally control (hereinafter referred to as "integrated control") chassis components related to driving, steering, and braking as well as the suspension. In the case of the integrated control, because the wheels may be driven independently and steered, movements that are different from those of a vehicle according to the related art are possible.

Meanwhile, a process of distributing a damping force of the suspension results in an optimal control problem of how much damping force (i.e., a damping control amount) is appropriately distributed to the wheels. In particular, solving the optimal control problem is a more important factor for the integrated control.

Of course, when there is no limit for the output of a suspension actuator in the optimal control problem, optimal control under an unconstrained condition is a problem. In this case, the suspension actuator serves to provide movement to a damper in the suspension to provide the damping force to the corresponding wheels.

However, because there is a limit in the output of the suspension actuator, an optimal control problem under a constrained condition should be solved in consideration of physical limits for the output of the suspension actuator. However, when the constrained condition is an inequation constrained condition provided as an output range of the suspension actuator, it is difficult to solve the optimal control problem or calculation thereof takes quite a long time. In this case, the inequation constrained condition does not mean a predetermined value of an optimum damping force at a current moment and means a range such as a certain level or higher or a certain level or lower.

In particular, in the case of other chassis devices, the chassis devices are operated by motors or hydraulic manners, and thus a limit of the actuator is clearly determined. On the other hand, in controlling the damping force of the suspension, the limit of the suspension actuator is changed at each moment depending on a speed of the suspension (i.e., a compression speed or tension speed of the damper). Accordingly, it is very difficult to quickly and optimally distribute the damping force of the suspension in a traveling vehicle.

However, the above-described content merely provides the background information related to the present disclosure and does not correspond to a previously disclosed technology.

SUMMARY

The present disclosure is directed to providing a suspension technology that distributes a damping force in consideration of a physical operating limit of a suspension.

The present disclosure is also directed to providing a suspension technology of obtaining a target damping control amount more quickly even in consideration of a physical operating limit of a suspension by correcting a target value for a damping force derived according to a control scheme of an equation constrained condition when the corresponding target value is greater than a physical operating limit of a suspension actuator.

However, the problem to be solved by the present disclosure is not limited to the above-mentioned problems, and the other problems that are not mentioned may be clearly understood by those skilled in the art to which the present disclosure pertains from the following description.

According to an aspect of the present disclosure, there is provided a control device for controlling each suspension in a vehicle, the control device including a memory, and a processor that controls a damping force provided through each suspension in the vehicle using information stored in the memory. The processor may identify a current state of the vehicle using sensor data of a sensor unit of the vehicle, perform a first process of obtaining a current damping force for a damper of each suspension according to the identified current state, identify an output range for an output of an actuator of each damper, which changes according to a damper speed, and perform a second process of determining a target damping force for each damper in consideration of the identified output range.

According to another aspect of the present disclosure, there is provided a control method, performed in a suspension system to control a damping force provided through each suspension in a vehicle, the control method including identifying a current state of the vehicle using sensor data of a sensor unit of the vehicle, performing a first process of obtaining a current damping force for a damper of the suspension according to the identified current state, identifying an output range for an output of an actuator of a damper, which changes according to a damper speed, and performing a second process of determining a target damping force for the damper in consideration of the identified output range.

According to yet another aspect of the present disclosure, there is provided a vehicle including a suspension system, wherein the suspension system includes a sensor unit that senses sensor data for identifying a current state of the vehicle, and a controller that controls a damping force provided through each suspension according to the current state of the vehicle, which is identified using the sensor data of the sensor unit. The controller may perform a first process of obtaining a current damping force for a damper of each suspension according to the current state, identify an output range for an output of an actuator of each damper, which changes according to a damper speed, and perform a second process of determining a target damping force for each damper in consideration of the identified output range.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION

Figure 1:
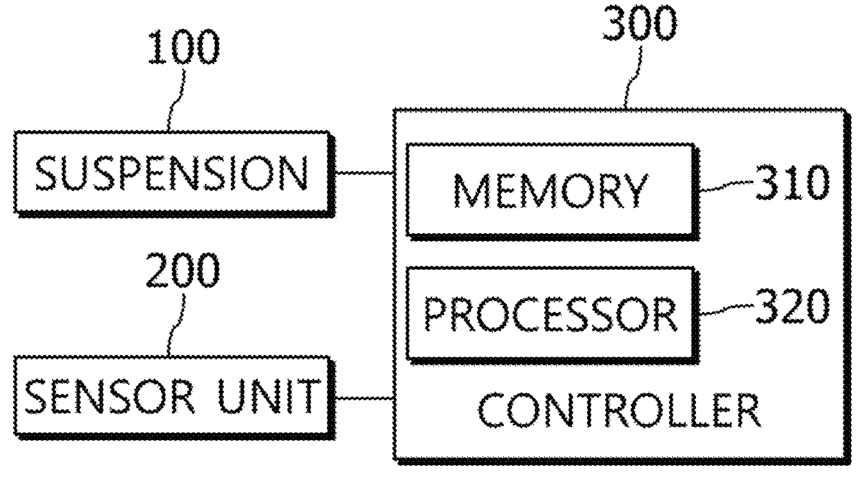
FIG. 1 is a schematic block diagram of a system according to some embodiments of the present disclosure.

The purposes, means, and effects of the present disclosure will become clearer through the following detailed description related to the accompanying drawings, and accordingly, those skilled in the art to which the present disclosure pertains will be easily implement the technical spirit of the present disclosure. Further, in the description of the present disclosure, when it is determined that the detailed description of widely known technologies related to the present disclosure may make the subject matter of the present disclosure unnecessarily unclear, the detailed description will be omitted.

Terms used in the specification are intended to describe embodiments and are not intended to limit the present disclosure. In the specification, a singular form also includes a plural form unless specifically mentioned in a phrase in some cases. In the specification, terms such as "include," "be provided with," "be equipped with," or "have" do not exclude the presence or addition of one or more other components other than the mentioned components.

In the specification, terms such as "or" and "at least one" may represent one of words listed together or a combination of two or more thereof. For example, in the wording "A or B" or "at least one of A and B", only one of the A and B may be included or both A and B may be also included.

In the specification, presented information such as cited characteristics, variables, or values may not be matched exactly in a description for the expression "for example," and the present disclosure according to various embodiments should not be limited by variations including an allowable error, a measurement error, a limit of measurement accuracy, and other commonly known factors.

In the specification, it should be understood that, when it is described that a first component is "connected" or "coupled" to a second component, the first component may be directly connected or coupled to the second component or a third component may be present between the first component and the second component. On the other hand, it should be understood that, when a first component is "directly connected" or "directly coupled" to a second component, a third component is not present therebetween.

In the specification, when it is described that a first component is provided "on" or "in contact with" a second component, the first component may be in direct contact with or connected to the second component or a third component may be present therebetween. On the other hand, it should be understood that, when it is described that a first component is provided "directly on" or "in direct contact with" a second component, a third component is not present therebetween. Other expressions that describe a relationship between components, such as "between" or "directly between," may be interpreted similarly.

In the specification, although the terms "first," "second," and the like may be used to describe various components, the components should not be limited by the terms. Further, the above terms should be not interpreted to limit a sequence of the components and may be used to distinguish a first component from a second component. For example, a "first component" may be referred to as a "second component", and similarly, a "second component" may be referred to as a "first component."

Unless otherwise defined, all the terms used herein may be used as meanings that may be commonly understood by those skilled in the art to which the present disclosure pertains. Further, terms defined in a commonly used dictionary are not interpreted ideally or excessively unless explicitly and specifically defined.

Hereinafter, embodiments of the present disclosure will be described in detail with reference to the accompanying drawings.

FIG. 1 is a schematic block diagram of a system according to some embodiments of the present disclosure.

The system 10 according to some embodiments of the present disclosure is a system provided in a vehicle and is a system that controls a suspension 100. To this end, as illustrated in FIG. 1, the system 10 may include the suspension 100, a sensor unit 200, and a controller 300. The system 10 may also be alternatively referred to as a "suspension system." Further, the controller 300 may be alternatively referred to as a "suspension control device." Of course, the suspension control device may be a component that further includes the sensor unit 200.

In some embodiments, the vehicle includes the system 10, and the system 10 may be a component included in an integrated control system in the vehicle. In this case, the "integrated control system" refers to a system that controls chassis components for driving, steering, and braking as well as the suspension 100 in an integrated manner.

The suspension 100, which is a device connecting wheels and a vehicle body of the vehicle, serves to improve riding comfort of a vehicle occupant and reduce fatigue of the vehicle body by absorbing an impact from the road surface. That is, the suspension 100 is used to adjust a damping force or a ride height depending on a vehicle state, a road surface state (e.g., a paved road, a dirt road, a sand road, a gravel road, or the like), or an obstacle (e.g., a bump, a step, a sinkhole, or the like), and thus, provides optimum riding comfort for the situations.

In some embodiments, the suspension 100 may include a spring and a damper to adjust the damping forces provided to the wheels. In this case, an elastic force of the spring increases in proportion to a compressed length or an extended length. That is, as the spring is more compressed, a force of the spring which returns to an original state thereof becomes stronger, and in contrast, as the spring extends more, a force of the spring which returns to the original state thereof becomes stronger.

The damper serves to reduce spring movement while the spring is repeatedly contracted or extended. That is, when there is only the spring without the damper, shaking of the vehicle body increases, and the damper suppresses this shaking to provide the riding comfort. To this end, an appropriate damping force may be provided to the wheels through movement of the damper according to a state of the vehicle at each moment. A magnitude of the damping force provided by the damper is proportional to a product of a damper speed and a damping coefficient.

In this case, the damper speed, which is a speed for the movement of the damper, may be a speed (i.e., a compression speed) when the damper presses the spring or a speed (i.e., a tension speed) when the damper extends the spring. However, hereinafter, the movement of the damper that presses the spring may be alternatively referred to as "compression of the damper," and the movement of the damper that extends the spring may be alternatively referred to as "tension of the damper." Further, the damper speed may be alternatively referred to as a "suspension speed." The movement of the damper may be provided through an actuator included in or connected to the damper.

In some embodiments, a sign of the damping force indicates whether the damper is in a compression state or a tension state. Accordingly, the damping force may have a positive value or a negative value depending on the presence or absence of compression or tension. In this case, the compression of the damper may have an opposite sign to the tension of the damper. As an example, in the case of the compression of the damper, the damping force may have a positive value, and in the case of the tension of the damper, the damping force may have a negative value. The signs may be exchanged.

The controller 300 calculates the damping force to be provided to the wheels through each damper according to the vehicle state and provides a corresponding control signal to the actuator of the damper. Accordingly, the actuator provides the movement of the damper to the damper to perform compression or tension according to the corresponding control signal. The actuator of the damper may also be alternatively referred to as a "suspension actuator."

A repulsive force of the damper becomes stronger in proportion to the damper speed. As an example, when compression or tension is performed at a low speed, a reaction force is small, and thus the damper moves easily, but when compression or tension is performed at a very high speed, a reaction force is very large, and thus the damper may not move. This is because the output of the actuator is not infinite and has a physical limit. In particular, the physical limits for the output of the actuator of the damper may change depending on the damper speed at each moment. That is, an allowable range (i.e., an output range) for the output of the actuator of the damper may vary depending on the damper speed. In this case, in the output range of the actuator of the damper according to the damper speed provided at a current time point, a maximum value is referred to as an upper limit UL, and a minimum value is referred to as a lower limit LL.

The sensor unit 200 senses various states required to control the suspension 100. That is, the sensor unit 200 may sense a road surface state, the presence or absence of an obstacle, a damper speed, or the like.

As an example, the sensor unit 200 may include an acceleration sensor that may measure a vertical acceleration of the wheels or the vehicle body to identify the road surface state, a wheel speed sensor that identifies a speed of the wheels, a camera that photographs front and rear sides or side surfaces of the vehicle, and the like, but the present disclosure is not limited thereto. As an example, the wheel speed sensor may be used in a driving assistance system such as an advanced driving assistance system (ADAS) or a vehicle body control system such as an anti-lock brake system (ABS)/traction control system (TCS).

In some embodiments, the controller 300 controls an operation of the present system 10. To this end, the controller 300 may include a memory 310 and a processor 320.

In some embodiments, the memory 310 stores various pieces of information required for the operation of the present system 10. In this case, the information stored in the memory 310 may include various sensor values measured through the sensor unit 200, information for a control operation of the controller 300, information to be signal-processed or analyzed in the controller 300, program information related to a control method which will be described below, or the like, but the present disclosure is not limited thereto.

For example, the memory 310 may include volatile memory elements such as a dynamic random access memory (DRAM) or a static random access memory (SRAM), non-volatile memories such as a phase-change random access memory (PRAM), a magnetic random access memory (MRAM), a resistive random access memory (ReRAM) or a NAND flash memory, or a hard disk drive (HDD) or a solid state drive (SSD), but the present disclosure is not limited thereto. Further, the memory 310 may be a cache, a buffer, a main memory, or an auxiliary memory or a separately provided storage system depending on a purpose/position thereof, but the present disclosure is not limited thereto.

In some embodiments, the processor 320 may perform various control operations on the present system 10 using information stored in the memory 310. That is, the processor 320 may identify the vehicle state or road surface state using sensor data sensed by the sensor unit 200 and control the suspension 100 connected to the wheels of the vehicle according to the identified corresponding state.

Hereinafter, a control method according to the embodiment of the present disclosure will be described in more detail.

Figure 2:
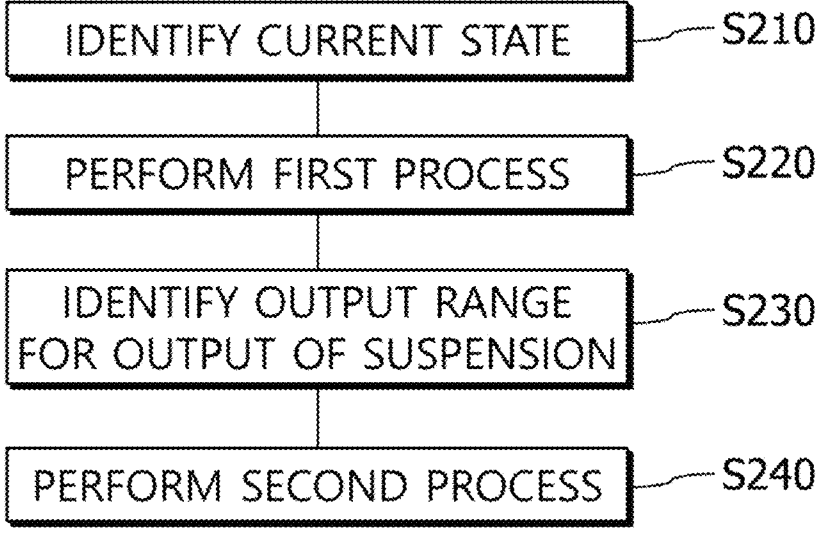
FIG. 2 is a flowchart illustrating a control method according to some embodiments of the present disclosure.

FIG. 2 is a flowchart illustrating a control method according to some embodiments of the present disclosure.

The control method according to some embodiments of the present disclosure is a method that is performed under the control of the controller 300 in the system 10 shown in FIG. 1, and may include operations S210 to S240 as illustrated in FIG. 2. In some embodiments, information that is necessary to perform the operations S210 to S240 may be stored in the memory 310 shown in FIG. 1, and accordingly, the processor 320 shown in FIG. 1 may perform processes of the operations S210 to S240 using the information stored in the memory 310.

In operation S210, the controller 300 shown in FIG. 1 identifies a current vehicle state or a current road surface state (hereinafter, referred to as a "current state") using the sensor data sensed by the sensor unit 200 shown in FIG. 1.

As an example, the current state may include a rolling state, a pitching state, a yawing state, or the like. In this case, the rolling state is a state in which the vehicle rotates and vibrates in a longitudinal direction (i.e., a full-length direction) of the vehicle. The pitching state is a state in which the vehicle rotates and vibrates in a transverse direction (i.e., a full-width direction) of the vehicle. The yawing state is a state in which the vehicle rotates and vibrates in a vertical direction (i.e., a full-height direction) of the vehicle.

In operation S220, the controller 300 obtains the damping force (i.e., a damping force of the damper) of the suspension 100 shown in FIG. 1, to be provided to the wheels to cope with the identified current state. Hereinafter, this process may be referred to as a "first process." That is, in the first process, the damping force to be distributed and provided through each damper may be calculated according to the current state identified based on the sensor data. In this way, the damping force calculated according to the first process may be referred to as a "current damping force" or a "current damping control amount."

In some embodiments, in the first process, the corresponding damping force is not obtained with an inequation constrained condition but is obtained with an equation constrained condition. In this case, the inequation constrained condition does not mean a predetermined value of the corresponding damping force at a current moment and means a range such as a certain level or higher or a certain level or lower. On the other hand, the equation constrained condition means a specific value of the corresponding damping force at the current moment. The corresponding specific value may be a value in a certain range.

In some embodiments, information on the current damping force to be provided to each damper depending on the current state may be stored in the memory 310 in advance. Accordingly, the processor 320 may identify the current damping force at the current moment using the information stored in the corresponding memory 310.

In some embodiments, in the case of a vehicle including four wheels, first to fourth suspensions are connected to first to fourth wheels, respectively. In this case, the current damping forces to be provided through dampers of the first to fourth suspensions are calculated through the first process. That is, a damping force to be provided through a first damper of the first suspension connected to a front left wheel FL, a damping force to be provided through a second damper of the second suspension connected to a front right wheel FR, a damping force to be provided through a third damper of the third suspension connected to a rear left wheel RL, and a damping force to be provided through a fourth damper of the fourth suspension connected to a rear right wheel RR may be calculated according to the first process.

In operation S230, the controller 300 identifies physical limits (i.e., an output range) for the output of each suspension 100 (i.e., the actuator of the damper) according to a current damper speed. That is, the controller 300 may identify the upper limit UL and the lower limit LL of the output range for the actuator of the damper at the current time.

In this case, the damper speed may be identified based on the sensor data of the sensor unit 200. That is, the controller 300 may identify the current damper speed of the damper of the suspension 100 using the sensor data sensed by the sensor unit 200. As an example, the controller 300 may calculate an acceleration of the damper using a wheel acceleration sensor provided in each wheel and an acceleration sensor of the vehicle and identify the damper speed of the damper by integrating the calculated corresponding acceleration.

In some embodiments, the physical limits (i.e., the output range) for the output of the actuator of the damper may change depending on the identified current damper speed. That is, an allowable range (i.e., an output range) for the output of the actuator of the damper may change depending on the identified damper speed.

Accordingly, the controller 300 may identify the output range of the actuator of the damper according to the damper speed provided at the current time and identify the upper limit UL and lower limit LL of the corresponding output range. That is, the controller 300 may identify the upper limit UL and lower limit LL of the output range for the damper at the current time. As an example, in the case of the vehicle including the four wheels, the controller 300 may identify the upper limit UL and the lower limit LL of the output range for each of the first to fourth dampers at the current time.

In some embodiments, operations S220 and S230 may be performed simultaneously or an execution order thereof may be reversed. In some embodiments, operation S230 may be performed simultaneously with operation S210 or an execution order thereof may be reversed.

In operation S240, the controller 300 obtains a target damping force (i.e., a target damping force of the damper) of the suspension 100 to be provided to the wheels in consideration of the identified output range. Hereinafter, this process may be referred to as a "second process."

In some embodiments, the controller 300 may generate a control signal that controls the actuator of the damper so that the target damping force obtained through the second process is provided to the damper. In this case, during the second process, the controller 300 may determine the current damping force itself as the target damping force to generate a corresponding control signal or may determine the target damping force by correcting the current damping force in consideration of the identified output range to generate a corresponding control signal. In some embodiments, the target damping force is a damping force that would be able to provide an optimal performance of vehicle driving. In this way, the target damping force calculated according to the second process may be alternatively referred to as an "optimal damping force" or a "target damping control amount."

Figure 3:
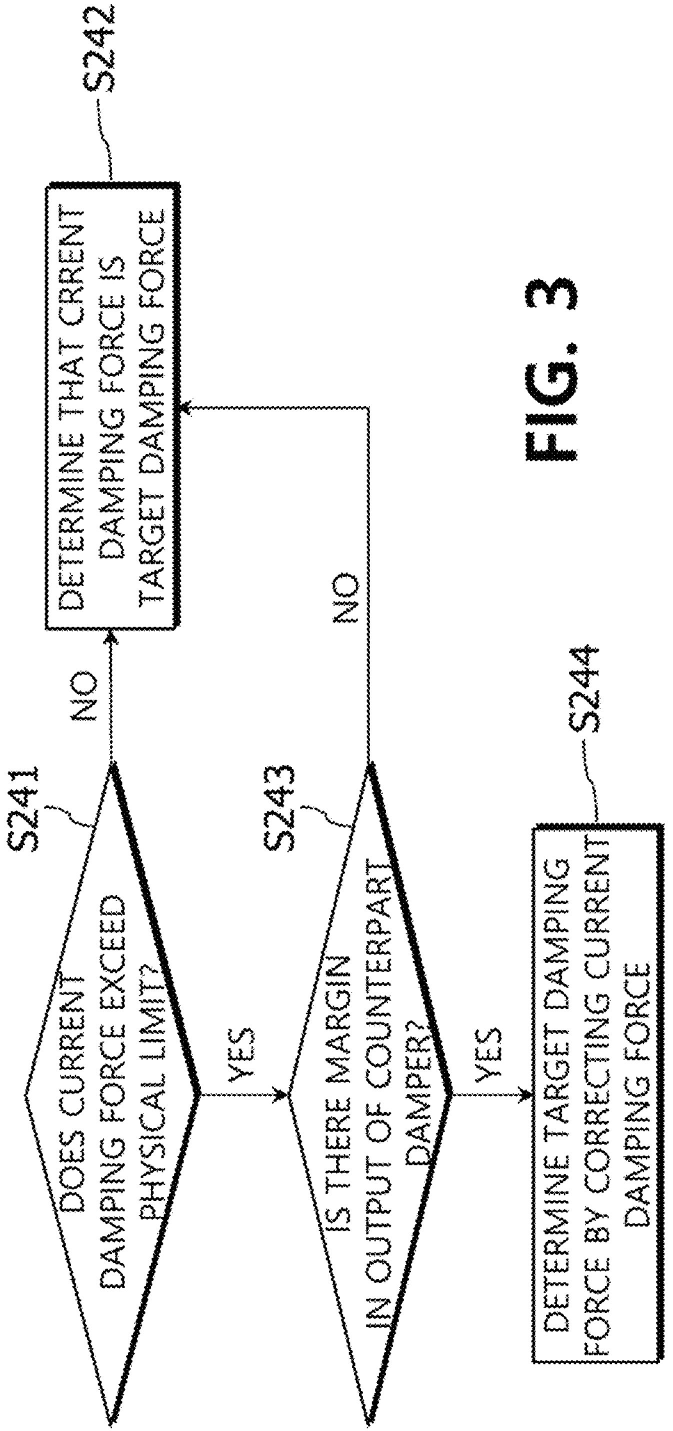
FIG. 3 is a more detailed flowchart of operation S240 shown in FIG. 1, according to some embodiments of the present disclosure.

FIG. 3 is a more detailed flowchart of operation S240 shown in FIG. 2, according to some embodiments of the present disclosure.

In some embodiments, operation S240 may include operations S241 to S244, as shown in FIG. 3.

In some embodiments, when the second process is performed on a damper D1, in operation S241, the controller 300 may identify whether a current damping force F1_1 of the corresponding damper D1 exceeds the physical limits (i.e., the output range) of the actuator of the corresponding damper D1 (i.e., whether the current damping force F1_1 is greater than the upper limit UL or less than the lower limit LL), and accordingly, may perform various controls.

That is, when the current damping force F1_1 is in the corresponding output range as a result of operation S241 (e.g., when it is determined by the controller 300 that the current damping force F1_1 is in the corresponding output range), the controller 300, in operation S242, does not correct the current damping force F1_1 for the damper D1 and determines the corresponding current damping force F1_1 as a target damping force (i.e., an optimum damping force) of the damper D1. This determination according to operation S242 may alternatively be referred to as "first determination process."

Differently, when the current damping force F1_1 is out of the corresponding output range as a result of operation S241 (e.g., when it is determined by the controller 300 that the current damping force F1_1 is out of the corresponding output range), the controller, in operation S243, 300 identifies whether there is a margin in the output of an actuator of a counterpart damper D2 relative to the damper D1. In some embodiments, the counterpart damper D2 is a damper positioned on a side opposite to the damper D1.

In some embodiments, when the damper D1 is the first damper, the counterpart damper D2 may be the second damper or the third damper. When the damper D1 is the second damper, the counterpart damper D2 may be the first damper or the fourth damper. When the damper D1 is the third damper, the counterpart damper D2 may be the first damper or the fourth damper. When the damper D1 is the fourth damper, the counterpart damper D2 may be the second damper or the third damper.

In some embodiments, in the rolling state, the first process may be performed so that the first and third dampers on a left side have the same current damping force and the second and fourth dampers on a right side have the same current damping force. That is, the damping force may be controlled in a state in which the wheels are separated into left side wheels and right side wheels. Accordingly, in the rolling state, when the damper D1 is the first damper or the third damper, the counterpart damper D2 may be the second damper or the fourth damper, and when the damper D1 is the second damper or the fourth damper, the counterpart damper D2 may be the first damper or the third damper.

Likewise, in the pitching state, the first process may be performed so that the first and second dampers at a front side have the same current damping force and the third and fourth dampers at a rear side have the same primary damping force. That is, the damping force may be controlled in a state in which the wheels are separated into front side wheels and rear side wheels. Accordingly, in the pitching state, when the damper D1 is the first damper or the second damper, the counterpart damper D2 may be the third damper or the fourth damper, and when the damper D1 is the third damper or the fourth damper, the counterpart damper D2 may be the first damper or the second damper.

In detail, in operation S243, the controller 300 calculates an extent to which the current damping force F1_1 of the damper D1 exceeds a limit (i.e., the upper limit UL or the lower limit LL) of the output range of the corresponding damper D1. That is, the controller 300 may calculate a difference value (i.e., a first difference value) between the current damping force F1_1 for the damper D1 and a boundary value (i.e., a value for the upper limit UL or the lower limit LL) of the output range for the damper D1. Accordingly, when the current damping force F1_1 for the damper D1 is greater than the upper limit UL of the output range for the damper D1 (e.g., when it is determined by the controller 300 that the current damping force F1_1 for the damper D1 is greater than the upper limit UL of the output range for the damper D1), the controller 300 may calculate the first difference value between the current damping force F1_1 and the upper limit UL of the output range. Further, when the current damping force F1_1 for the damper D1 is less than the lower limit LL of the output range for the damper D1 (e.g., when it is determined by the controller 300 that the current damping force F1_1 for the damper D1 is less than the lower limit LL of the output range for the damper D1), the controller 300 may calculate the first difference value between the current damping force F1_1 and the lower limit LL of the output range.

Further, in operation S243, the controller 300 calculates a difference value (i.e., a second difference value) between a current damping force F1_2 for the counterpart damper D2 and the boundary value (i.e., the value for the upper limit UL or the lower limit LL) of the output range for the counterpart damper D2. Accordingly, when the primary damping force F1_2 for the counterpart damper D2 is relatively closer to the upper limit UL of the output range for the counterpart damper D2 (e.g., when it is determined by the controller 300 that the primary damping force F1_2 for the counterpart damper D2 is relatively closer to the upper limit UL of the output range for the counterpart damper D2), the controller 300 may calculate the second difference value between the current damping force F1_2 for the counterpart damper D2 and the upper limit UL of the output range for the counterpart damper D2. Further, when the current damping force F1_2 for the counterpart damper D2 is closer to the lower limit LL of the output range for the counterpart damper D2 (e.g., when it is determined by the controller 300 that the current damping force F1_2 for the counterpart damper D2 is closer to the lower limit LL of the output range for the counterpart damper D2), the controller 300 may calculate the second difference value between the current damping force F1_2 and the lower limit LL of the output range.

In some embodiments, it is preferable that the first and second difference values be absolute values. Accordingly, in operation S243, when the second difference value is the first difference value or less (e.g., when it is determined by the controller 300 that the second difference value is the first difference value or less), the controller 300 determines that there is no margin in the output of the actuator of the counterpart damper D2. The controller 300 performs operation S242 according to the result of operation S243. That is, the controller 300 determines that the current damping force F1_1 itself for the damper D1 is the target damping force (i.e., the optimum damping force) for the damper D1 at the current time.

Differently, in operation S243, when the second difference value is greater than the first difference value (e.g., when it is determined by the controller 300 that the second difference value is greater than the first difference value), the controller 300 determines that there is a margin in the output of the actuator of the counterpart damper D2. That is, the controller 300 determines that a margin is existing in the output of the actuator of the counterpart damper D2. The controller 300 performs operation S244 according to the result of operation S243. That is, in operation S244, the controller 300 determines the target damping forces of the damper D1 and the counterpart damper D1 by correcting the current damping forces F1_1 and F1_2 for the damper D1 and the counterpart damper D1. This determination according to operation S244 may be alternatively referred to as "second determination", and operation S244 may be alternatively referred to as a "correction operation."

In detail, in operation S244, the controller 300 determines a value calculated by subtracting the first difference value from the current damping force F1_1 of the damper D1 as the target damping force for the damper D1 at the current time and determines a value calculated by adding the first difference value to the current damping force F1_2 of the counterpart damper D2 as the target damping force for the counterpart damper D2 at the current time.

In some embodiments, in operation S240 shown in FIG. 2, operations of S241 to S244 shown in FIG. 3 and described above for a certain damper D1 may also be performed on each of the remaining dampers. In some embodiments, these operations may be performed simultaneously or sequentially.

FIGS. 4 to 8 are graphs showing examples related to operations S220 to S240, shown in FIG. 2, according to some embodiments of the present disclosure. In FIGS. 4 to 8, a horizontal axis represents a time (t), and a vertical axis represents a damping force.

Figure 4:
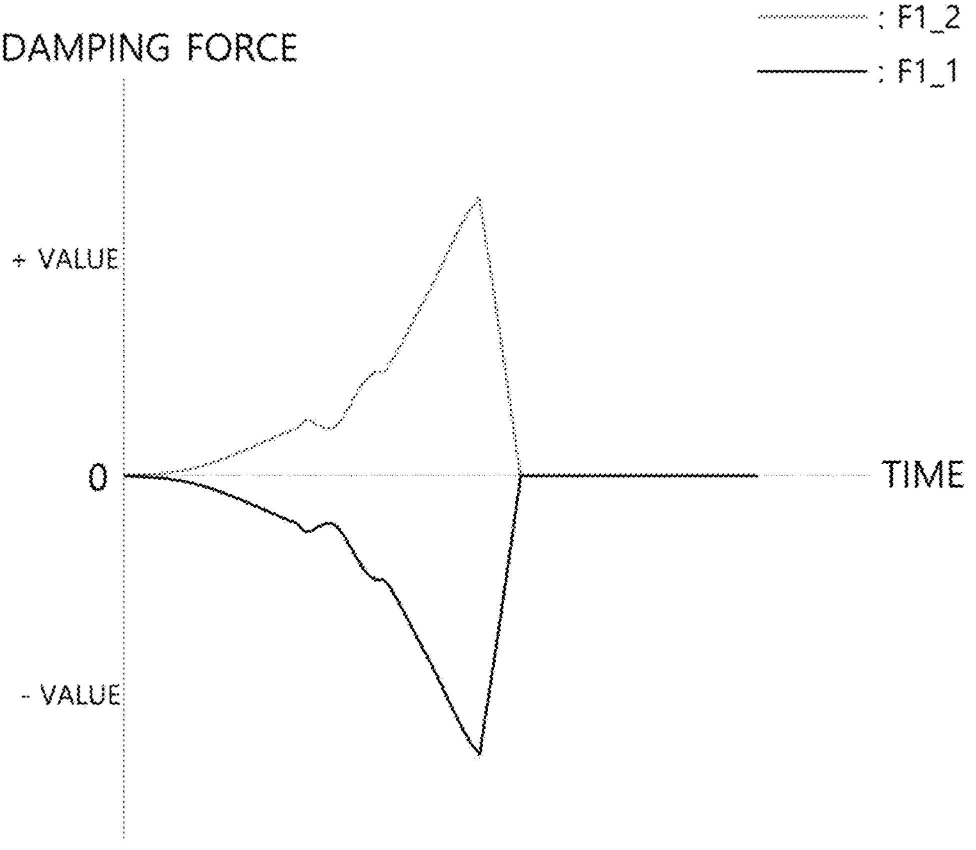
FIGS. 4 to 8 are graphs showing examples related to operations S220 to S240, shown in FIG. 1, according to some embodiments of the present disclosure.

As illustrated in FIG. 4, in operation S220, the current damping force F1_1 for the damper D1 and the current damping force F1_2 for the counterpart damper D2 of the damper D1 may be obtained.

Figure 5:
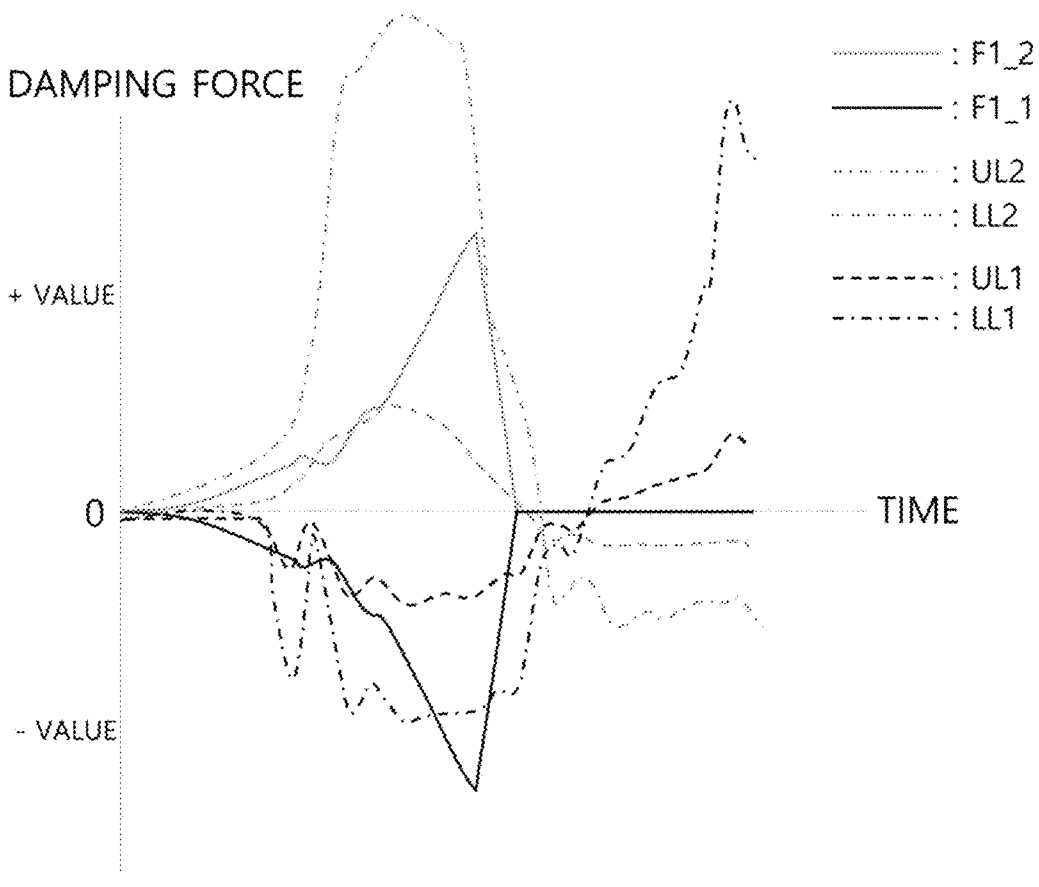
Figure 6:
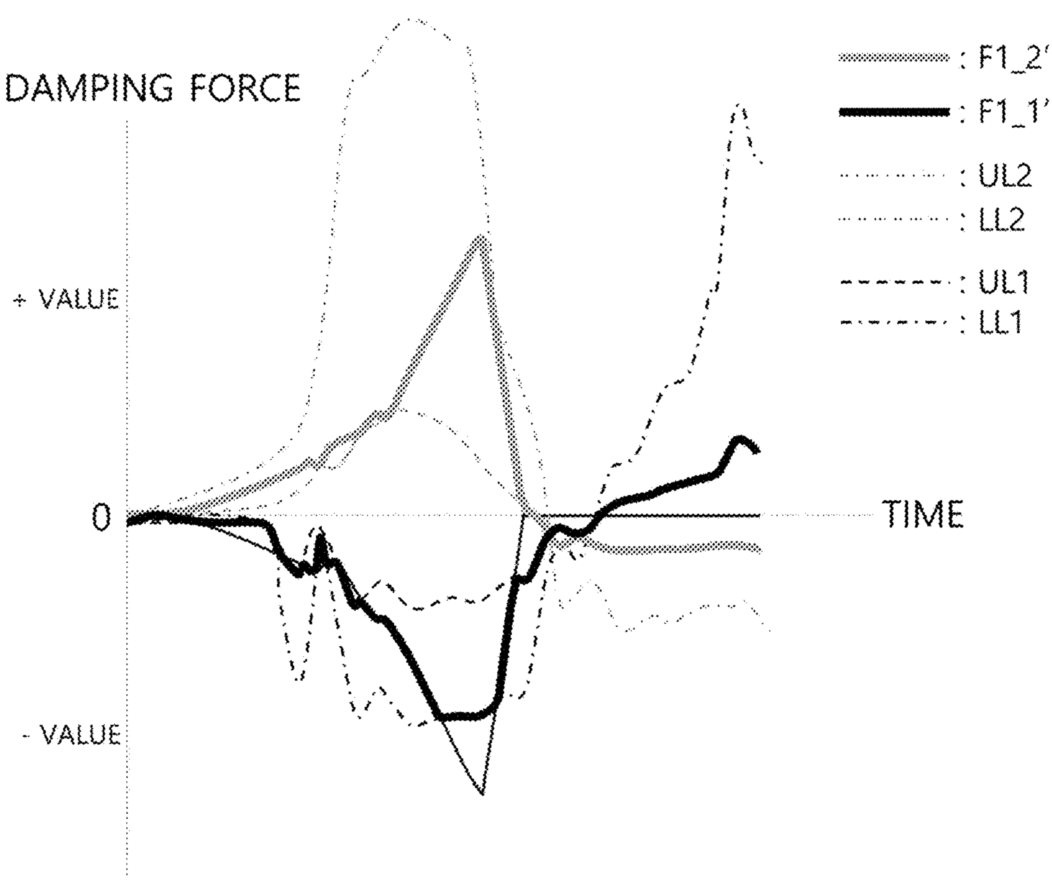

Thereafter, as illustrated in FIG. 5, in operation S230, an upper limit UL1 and a lower limit LL1 for the output range of the actuator of the damper D1 and an upper limit UL2 and a lower limit LL2 for the output range of the actuator of the counterpart damper D1 may be identified according to the current damper speed. In this case, a graph for current damping forces F1_1' and F1_2' within the limit range of the upper limits UL1 and UL2 and the lower limits LL1 and LL2 may be expressed in a bold form as in FIG. 6.

Figure 7:
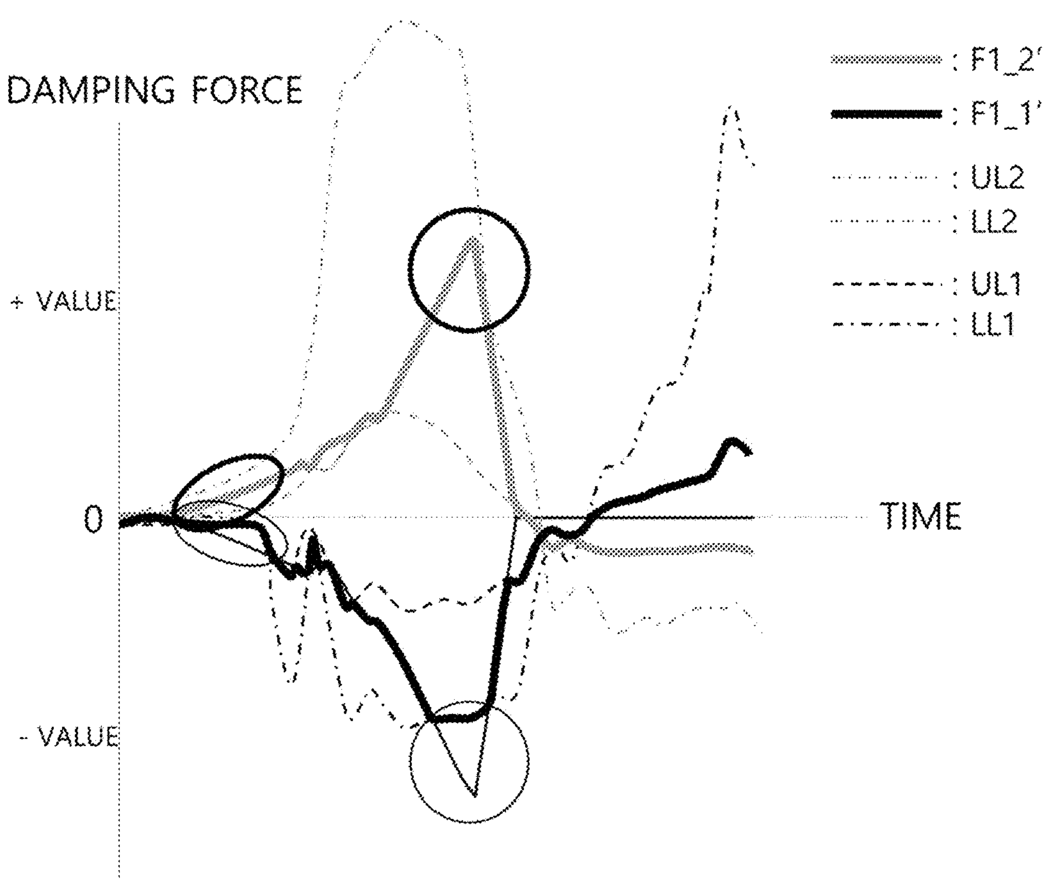

Further, as illustrated in FIG. 7, a portion in which the current damping force F1_1 of the damper D1 is out of the output range of the actuator of the damper D1 is shown in the area of the thin circle of FIG. 7, and a portion in which the actuator of the counterpart damper D2 is positioned at a time corresponding to the thin circle is shown in the area of the thick circle of FIG. 7.

Figure 8:
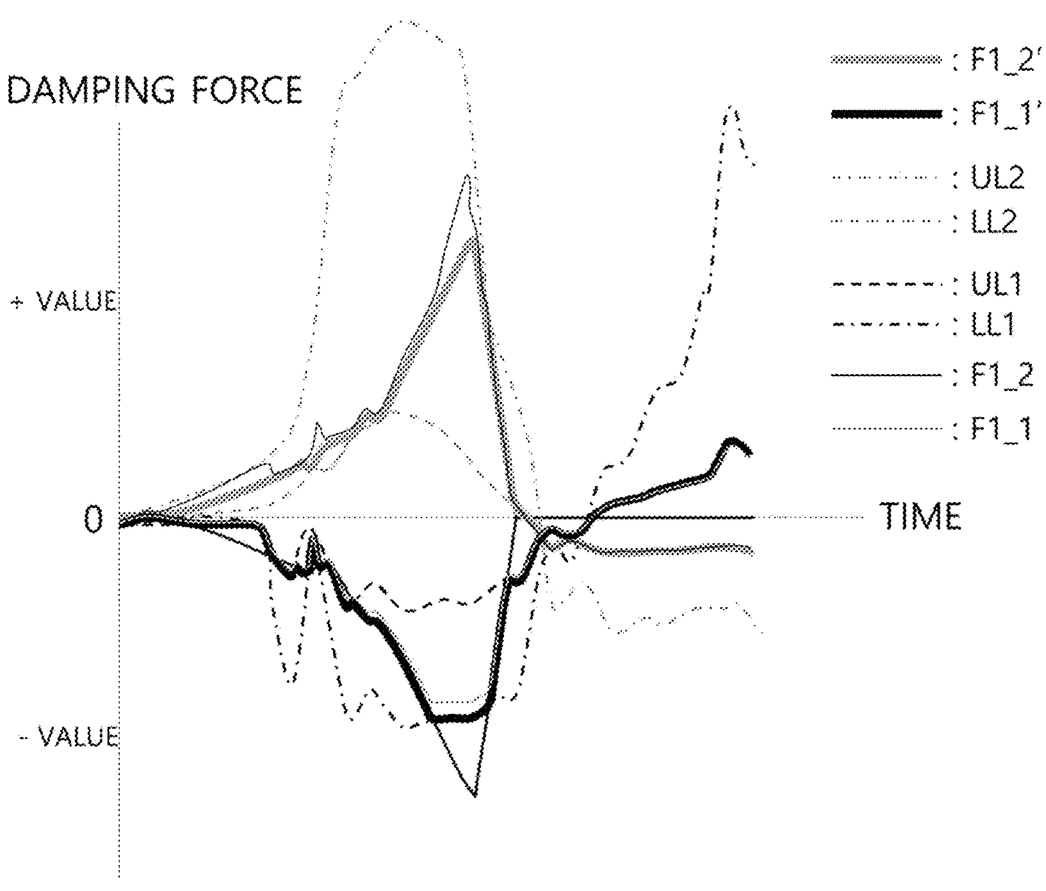

Accordingly, as illustrated in FIG. 8, in operation S244 of operation S240, a secondary damping force F2_1 corrected by subtracting the first difference value from the current damping force F1_1 of the damper D1 is determined to be the target damping force for the damper D1 at the current time in the thin circle of FIG. 7. Further, a secondary damping force F2_2 corrected by adding the first difference value to the current damping force F1_2 of the counterpart damper D2 is determined to be the target damping force for the counterpart damper D2 at the corresponding time in the thick circle of FIG. 7.

According to some embodiments, in FIG. 8, in the case of the remaining areas not including areas in the thin circle of FIG. 7 and the thick circle of FIG. 7, in operation S242 of operation S240, the currently damping forces F1_1 and F1_2 themselves for the damper D1 and the counterpart damper D2 are determined to be the target damping forces for the damper D1 and the counterpart damper D2 at the corresponding time.

As described above, in the present disclosure, the damping force can be distributed in consideration of a physical operating limit of the suspension 100. That is, in the present disclosure, after a target value for the damping force is primarily derived according to an optimal control problem of the equation constrained condition, the target value is secondarily corrected when the derived target value exceeds the physical operating limit of the actuator of the damper of the suspension 100, and thus an optimum damping control amount can be obtained more quickly even in consideration of the physical operating limit of the suspension 100.

In the present disclosure, a damping force can be distributed in consideration of a physical operating limit of a suspension.

That is, in the present disclosure, after a target value for the damping force is primarily derived according to an optimal control problem of an equation constrained condition, the target value is secondarily corrected when the derived target value exceeds a physical operating limit of an actuator of the suspension, and thus an optimum damping control amount can be obtained more quickly even in consideration of the physical operating limit of the suspension.

The effects obtained in the present disclosure are not limited to the effects described above, and other effects not described will be clearly understood by those skilled in the art to which the present disclosure pertains from the following description.

Although embodiments of the present disclosure have been described, the spirit of the present disclosure is not limited to the embodiments presented in the specification. Those skilled in the art who understand the spirit of the present disclosure can easily propose other embodiments by adding, changing, deleting, or the like of components within the same scope of the spirit. Further, these other embodiments also belong to the scope of the spirit of the present disclosure.

What is claimed is:

1. A control device for controlling each suspension in a vehicle, the control device comprising:

a memory; and a processor configured to control a damping force provided through each suspension in the vehicle using information stored in the memory, wherein the processor is further configured to:

identify a current state of the vehicle using sensor data of a sensor unit of the vehicle;

perform a first process of obtaining a current damping force for a damper of each suspension according to the identified current state;

identify an output range for an output of an actuator of each damper, which changes according to a damper speed; and perform a second process of determining a target damping force for each damper in consideration of the identified output range, and wherein, in the second process, the processor determines the target damping force for a particular damper by correcting the current damping force for the particular damper, in response to determination that: the current damping force for the particular damper is out of the output range for the particular damper; and that there is a margin in an output of an actuator of a counterpart damper for the particular damper.

2. The control device of claim 1, wherein, in the second process, the processor determines the current damping force for a particular damper as the target damping force for the particular damper, in response to a determination that the current damping force for the particular damper is in the output range for the particular damper.

3. The control device of claim 1, wherein, in the second process, the processor determines the current damping force for a particular damper as the target damping force for the particular damper, in response to determinations that: the current damping force for the particular damper is out of the output range for the particular damper; and that there is no margin in an output of an actuator of a counterpart damper for the particular damper.

4. The control device of claim 3, wherein, in the second process, the processor:

calculates a first difference value between the current damping force of the particular damper and an output range boundary value for the particular damper;

calculates a second difference value between the current damping force of the counterpart damper and an output range boundary value for the counterpart damper; and determines that there is no margin in the output of the actuator of the counterpart damper, in response to a determination that an absolute value of the second difference value is smaller than or equal to an absolute value of the first difference value.

5. The control device of claim 1, wherein, in the second process, the processor:

calculates a first difference value between the current damping force of the particular damper and an output range boundary value for the particular damper;

calculates a second difference value between the current damping force of the counterpart damper and an output range boundary value for the counterpart damper; and determines that there is the margin in the output of the actuator of the counterpart damper, in response to a determination that an absolute value of the second difference value is greater than an absolute value of the first difference value.

6. The control device of claim 1, wherein, in the second process, the processor:

determines a value that is calculated by subtracting a first difference value between the current damping force of the particular damper and an output range boundary value for the particular damper from the current damping force of the particular damper, as the target damping force for the particular damper; and determines a value that is calculated by adding the first difference value to the current damping force of the counterpart damper, as the target damping force for the counterpart damper.

7. The control device of claim 1, wherein, in the second process, the processor sets each damper of left wheels of the vehicle as one of the particular damper and the counterpart damper and sets each damper of right wheels of the vehicle as the other one of the particular damper and the counterpart damper, in response to an identification that the current state is a rolling state.

8. The control device of claim 1, wherein, in the second process, the processor sets each damper of front wheels of the vehicle as one of the particular damper and the counterpart damper and sets each damper of rear wheels of the vehicle as the other one of the particular damper and the counterpart damper, in response to an identification that the current state is a pitching state.

9. A control method, performed in a suspension system to control a damping force provided through each suspension in a vehicle, the control method comprising:

identifying a current state of the vehicle using sensor data of a sensor unit of the vehicle;

performing a first process of obtaining a current damping force for a damper of the suspension according to the identified current state;

identifying an output range for an output of an actuator of a damper, which changes according to a damper speed; and performing a second process of determining a target damping force for the damper in consideration of the identified output range, wherein the performing of the second process comprises:

determining the target damping force for a particular damper by correcting the current damping force for the particular damper, in response to determinations that the current damping force for the particular damper is out of the output range for the particular damper, and that there is a margin in an output of an actuator of a counterpart damper for the particular damper.

10. The control method of claim 9, wherein the performing of the second process comprises:

determining the current damping force for a particular damper as the target damping force for the particular damper, in response to a determination that the current damping force for the particular damper is in the output range for the particular damper.

11. The control method of claim 9, wherein the performing of the second process comprises:

determining the current damping force for a particular damper as the target damping force for the particular damper, in response to determinations that the current damping force for the particular damper is out of the output range for the particular damper, and that there is no margin in an output of an actuator of a counterpart damper for the particular damper.

12. The control method of claim 11, wherein the performing of the second process comprises:

calculating obtaining a first difference value between the current damping force of the particular damper and an output range boundary value for the particular damper;

calculating a second difference value between a current damping force of the counterpart damper and an output range boundary value for the counterpart damper; and determines that there is no margin in the output of the actuator of the counterpart damper, in response to a determination that an absolute value of the second difference value is smaller than or equal to an absolute value of the first difference value.

13. The control method of claim 9, wherein the performing of the second process further comprises:

calculating a first difference value between the current damping force of the particular damper and an output range boundary value for the particular damper;

calculating a second difference value between the current damping force of the counterpart damper and an output range boundary value for the counterpart damper; and determining that there is the margin in the output of the actuator of the counterpart damper, in response to a determination that an absolute value of the second difference value is greater than an absolute value of the first difference value.

14. The control method of claim 9, wherein the performing of the second process further comprise:

determining a value that is calculated by subtracting a first difference value between the current damping force of the particular damper and an output range boundary value for the particular damper from the current damping force of the particular damper, as the target damping force for the particular damper; and determines a value that is calculated by adding the first difference value to the current damping force of the counterpart damper, as the target damping force for the counterpart damper.

15. The control method of claim 9, wherein the performing of the second process further comprises:

setting each damper of left wheels of the vehicle as one of the particular damper and the counterpart damper, and setting each damper of right wheels of the vehicle as the other one of the particular damper and the counterpart damper, in response to an identification that the current state is a rolling state.

16. The control method of claim 9, wherein the performing of the second process further comprises:

setting each damper of front wheels of the vehicle as one of the particular damper and the counterpart damper, and setting each damper of rear wheels of the vehicle as the other one of the particular damper and the counterpart damper, in response to an identification that the current state is a pitching state.

17. A vehicle including a suspension system, wherein the suspension system includes:

a sensor unit configured to sense sensor data for identifying a current state of the vehicle; and a controller configured to control a damping force provided through each suspension according to the current state of the vehicle, which is identified using the sensor data of the sensor unit, the controller is configured to:

perform a first process of obtaining a current damping force for a damper of each suspension according to the current state;

identify an output range for an output of an actuator of each damper, which changes according to a damper speed; and perform a second process of determining a target damping force for each damper in consideration of the identified output range, and wherein, in the second process, the controller determines the target damping force for a particular damper by correcting the current damping force for the particular damper, in response to determination that: the current damping force for the particular damper is out of the output range for the particular damper; and that there is a margin in an output of an actuator of a counterpart damper for the particular damper.

18. The vehicle of claim 17, further comprising:

an integrated control system configured to control the suspension, driving, steering, and braking in an integrated manner, wherein the suspension system is included in the integrated control system.

* * * * *